March 22, 1949.  L. PORTNER  2,464,938
MACHINE FOR FORMING THE DOUGH FOR BAKERS' ROLLS
Filed June 24, 1947  3 Sheets-Sheet 1
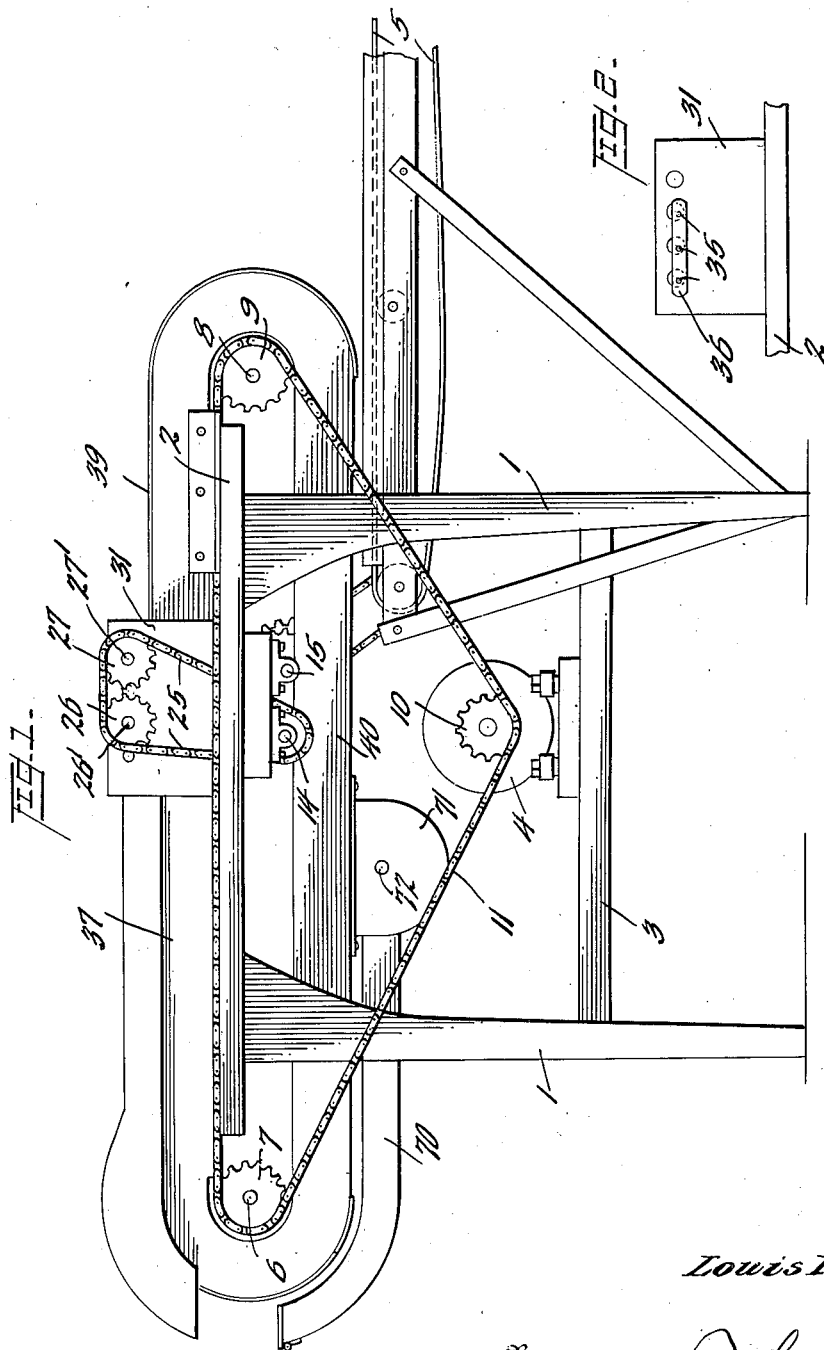
Inventor
Louis Portner,
By
Parky Cook
Attorney

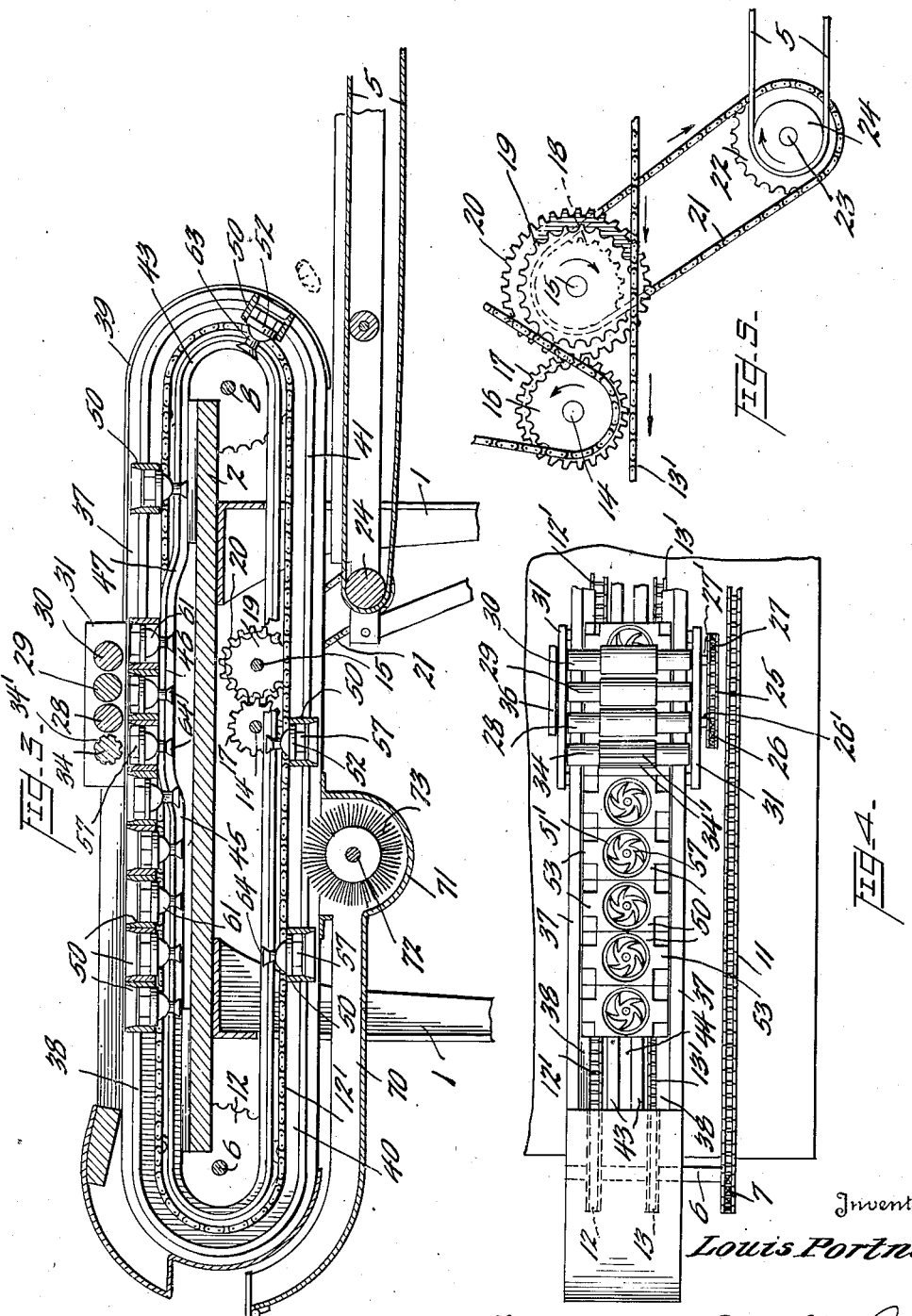

March 22, 1949. L. PORTNER 2,464,938
MACHINE FOR FORMING THE DOUGH FOR BAKERS' ROLLS
Filed June 24, 1947 3 Sheets-Sheet 3
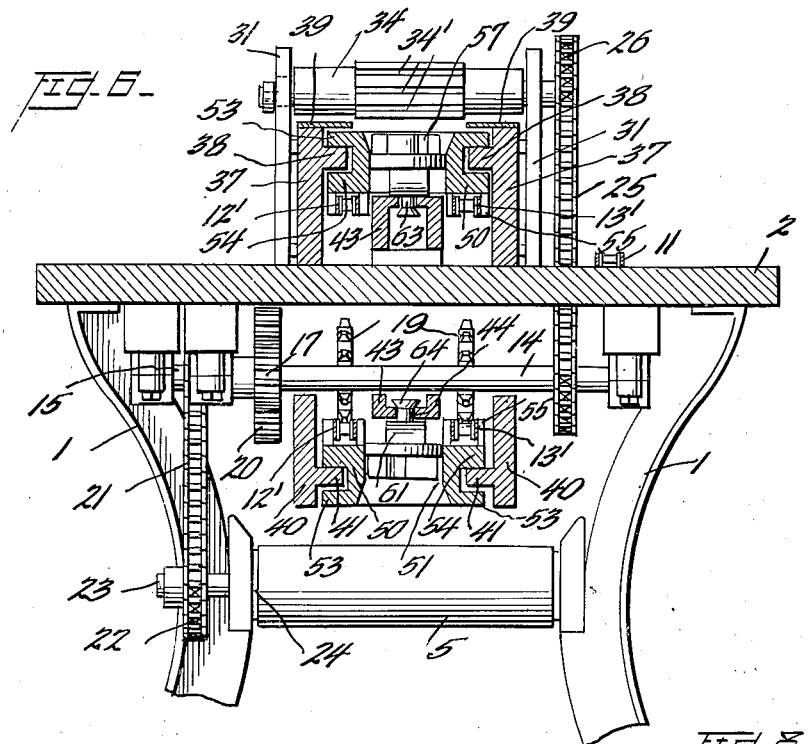
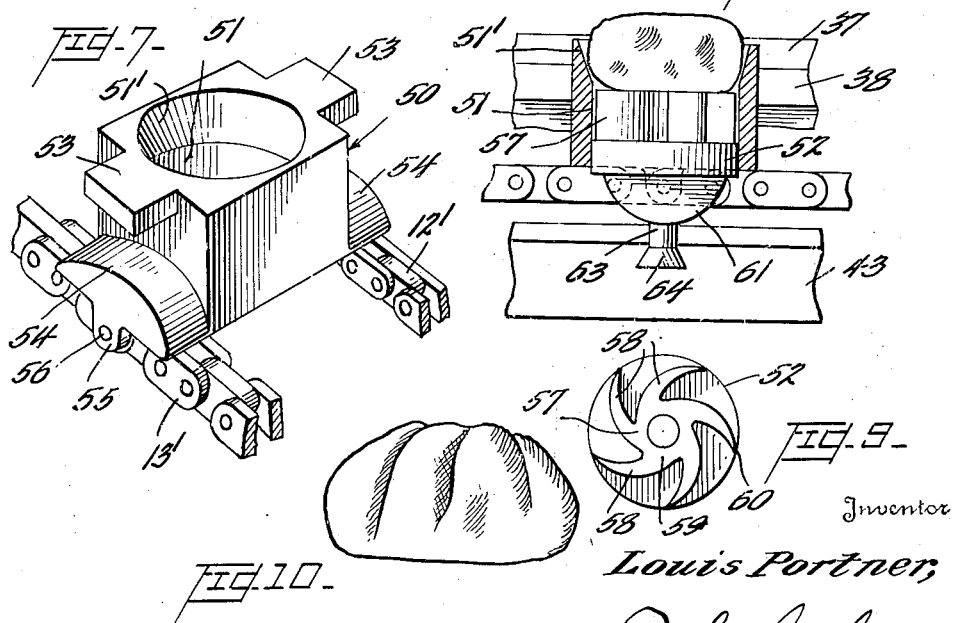
Inventor
Louis Portner;
Parker Cook
Attorney Patented Mar. 22, 1949

2,464,938

UNITED STATES PATENT OFFICE 2,464,938

MACHINE FOR FORMING THE DOUGH FOR BAKERS' ROLLS

Louis Portner, Margate City, N. J.

Application June 24, 1947, Serial No. 756,679

7 Claims. (Cl. 107—8)

My invention relates to new and useful improvements in machines used in the baking industry; and, more particularly, to a machine for forming and scoring the dough used in the making of baker's rolls.

As is well known to those skilled in the art, baker's rolls, when in the form of uncooked dough, are shaped in disc form of about three-quarters of an inch or greater in thickness; and then a die, generally having five knives, is forced into the disc so that when the roll is baked and rises, it may easily be broken into several parts for convenience in eating.

The machines of which I am aware for scoring the dough generally provide a receptacle for the dough, after which the dough is moved under a piston, the dough being held stationary while the piston descends to score the dough, and this is continually repeated.

One of the objects of the present invention is to provide a machine wherein the dough, in the form of relatively thick discs, are fed to carriers driven by endless chains; and when the discs reach a certain portion of the machine, the pistons in the carriers are forced upwardly and rollers contact the upper surface of the dough, pressing the knives in the dough, so that it is unnecessary to stop the forward movement of the dough while the impression is made, which is the case with the machines of this general type, with which I am familiar.

Still another object of the invention is to provide a machine wherein there are provided endless chains with a plurality of carriers and a plurality of rollers mounted centrally of the machine; while in each carrier there is a piston provided with a die, and, as the carriers move under the rollers, the pistons rise in the cylinders to force the dies of the pistons well up into the dough, and the dies remaining in the dough while the carriers and dough pass under four adjacent rollers, to thus assure a complete dividing and scoring of the dough.

Another object of the invention is to provide a machine that is continuous in operation, the dough to be fed to the machine at the forward end and continuously advanced, so that the dough may be marked while in transit; and when the dough reaches the far end of the machine, the carriers will be inverted so that the now marked and scored dough drops on an endless conveyor with the scored dough (rolls) with the top-side up, from whence the scored dough may be removed and placed in the baker's oven.

Still another object of the invention is to provide a machine wherein the carriers that hold the dough are supported on tracks and moved by two endless conveyors while the pistons with their dies in the carriers are elevated for a short space of time when the dough is passing under adjacent overhead rollers, after which the pistons again assume their lowered position, preparatory to receiving the next discs of dough.

Still another object of the invention is to provide a machine wherein the scoring and dividing of the dough is continuous so that a far greater number of rolls can be marked and divided than heretofore has been possible in machines for a similar purpose.

Still another object of the invention is to provide a machine wherein the pluralities of carriers and pistons are identical, so that in case of breakage or damage, it is a simple matter to remove the damaged parts and replace them with new ones.

With these and other objects in view, the invention consists in certain new and novel arrangements and combination of parts as will hereinafter be more fully described and pointed out in the claims.

Referring now to the drawings, showing a preferred embodiment,

Fig. 1 is a side elevational view of the machine,

Fig. 2 is a fragmentary detail taken from the opposite side of the machine, showing the manner of connecting the pressing rollers, Fig. 3 is a vertical, sectional view of the machine, showing the manner in which the carriers and pistons are elevated when directly beneath the pressing rollers, a number of the carriers being omitted for clearness of illustration, Fig. 4 is a fragmentary, top plan view, showing the dies within the cylinders of the carriers, which dies score and divide the dough of the rolls, Fig. 5 is a diagrammatic view of the chain drive for the pressing rollers and the conveyor belt at the dispensing end of the machine, Fig. 6 is a vertical section taken about centrally of the machine at right angles to Fig. 3, Fig. 7 is a perspective of one of the carriers in which the dough is scored, Fig. 8 is a sectional view of a carrier, showing it attached to one of the endless conveyor chains, and a part of the track that actuates the pistons, Fig. 9 is a top plan view of the piston and its die, and Fig. 10 is a side elevation of one of the rolls after having been scored and baked.

Referring now more particularly to the several views, and, for the moment, to Fig. 1, there is shown the stand with the legs 1 and the table 2 there being a shelf 3 secured to the legs 1 on which shelf 3 is mounted the driving power in the form of a motor 4. By mounting the motor 4 right on the stand, the machine is mobile and can be moved to any desired place in the bakery.

Also secured to the stand and at the right hand end (Fig. 1), there may be seen a portion of the endless dispensing conveyor belt 5 which is indirectly driven from the motor 4 as will be hereafter mentioned. This endless conveyor belt 5 is to receive the dough (baker's rolls) after it has been scored and dispensed from the machine.

Suitably supported at the forward end of the machine, that is, to the left in Fig. 1, there is shown a shaft 6 with its sprocket gear 7 while at the opposite end of the machine is a similar shaft 8 and a sprocket gear 9. The motor 4 is likewise provided with a sprocket 10 on the end of its shaft, while over these respective sprocket gears 7, 9, and 10 is fitted the sprocket chain 11 so that on an operation of the motor 4 these shafts 6 and 8 are driven through the sprocket chain 11 as will readily be understood.

Means (not shown), of course, will be provided for regulating the speed of the motor 4 so that the rate of movement of the sprocket chain 11 and the driven shafts can be controlled.

On the shaft 6 there is mounted (see Figs. 4 and 6) further sprocket gears 12 and 13 over which pass the respective sprocket chains 12' and 13'; and, likewise on the shaft 8 there will be two similar sprocket wheels (not shown) over which these sprocket chains 12' and 13' pass. It is these sprocket chains 12' and 13' that actuate the carriers 50 for the dough, which carriers will be referred to as the specification proceeds.

Referring to Fig. 1 again, for the moment, there is shown mounted beneath the table 2 the cross shaft 14 and the further shaft 15 and on this shaft 14 (as may be seen in Fig. 5) there is a sprocket 16 and the gear 17. Likewise, on the shaft 15 there is a sprocket 18, the further sprocket 19, and the gear 20. The sprocket 18 drives a sprocket chain 21 which in turn drives the sprocket 22 mounted on a shaft 23 which in turn is provided with a drum or roller 24 which in turn actuates the heretofore mentioned endless conveyor 5 on which the baker's rolls (dough) drop from the machine after being scored.

The sprocket wheel 19 in turn is driven by meshing with the sprocket chain 13, heretofore mentioned, to thus drive the shaft 15 and the gear 20 on the shaft 15 which gear 20 meshes with the gear 17 on the driving shaft 14 to in turn drive this sprocket chain 25. The sprocket chain 25 also passes over two sprocket wheels 26 and 27 mounted respectively on the shafts 26' and 27'. Thus, on a movement of the sprocket chain 11 from the motor 4, the conveyor chains 12' and 13' are driven, which in turn through the sprockets and gears just mentioned on the shafts 14 and 15 will drive the endless conveyor belt 5 and will also actuate the shafts 26' and 27' through the movement of the chain 25. The purpose of driving these shafts 26' and 27' is that they in turn drive the pressing rollers 28, 29, and 30 which may be seen in Figs. 3 and 4.

These rollers 28, 29, and 30 are located about centrally of the machine and extend transversely thereof and are suitably mounted in the supports 31. There will be noticed an additional roller 34 ahead of these three rollers mentioned, and this roller 34 is not driven by the chain 25, but is free to rotate by coming in contact with the dough forming the rolls as will be mentioned shortly.

As may be seen in Fig. 2, on the ends of the several rollers 28, 29 and 30 may be seen the small eccentrically mounted crank pins 35, these being connected to the crank arm 36 so that all three of these rollers 28, 29 and 30 are driven by a movement of the chain 25.

The shafts 26' and 27' may be a part of the rollers 28 and 30, but by providing the crank pins 35 and the crank arm 36, all three of the rollers, 28, 29, and 30 are driven by the movement of the chain 25.

After having explained the various chain drives, reference is now made to Fig. 6, in which there will be seen the two supports 37 which extend throughout the length of the table 2 with the inwardly extending tracks 38 and over which may be seen the respective guards 39. Likewise, extending beneath the table 2 are the supports 40 which are a continuation of the supports 37 having the inwardly extending tracks 41 which are really a continuation of the tracks 38; and it is on these tracks 38 that the carriers 50 are supported when they are travelling on the upper surface of the table 2; and, likewise, on the tracks 41, when they are beneath the table 2 in their endless travel.

Also secured to the bed 2 is the central track 43 which is likewise endless in character, it extending completely along the top, around the ends, underneath, and again to the top of the table 2 in a similar manner that the tracks 38 extend over and under the table 2. The track 43, however, is of box-like channel formation and is divided throughout its length as at 44, as a part of the connecting bolts for the pistons is secured within the track 43 as may be seen in Fig. 6.

It will be noted that the track 43 passes centrally beneath the rollers 28, 29, 30, and 34. The purpose of this track 43 is to elevate the pistons and dies within the carriers 50, as will shortly be mentioned.

Referring for the moment to Fig. 3, the track 43 above the table 2 may be seen extending in its horizontal plane, with the exception that about centrally of the machine the track is elevated, starting at about the point 45 which is at a point just preceding the aformentioned rollers 34, 28, 29 and 30. It remains in this elevated position, that is, at 46 and then declines as at 47 to its horizontal position. The purpose of this elevated portion of the track 43 with respect to the track 38 is to raise the pistons and dies within the carriers 50 at these points so that the dough will be compressed by the rollers within the carriers 50 and about the dies on the pistons.

It will be understood that in Fig. 3, I have not shown all the carriers 50, but what I consider a sufficient number of the same to illustrate their travel, and to illustrate how the pistons are in their normal position in the beginning of the travel to the rollers, as well as their elevated position about centrally of the machine when beneath the rollers. I have also illustrated but two of the carriers 50 beneath the table 2 journeying along on their way to their upper position.

It will, of course, be understood that these carriers 50 in actual use are positioned adjacent to each other throughout the whole length of the sprocket chains 12' and 13', as shown in Fig. 4, so that there will always be a carrier to receive the dough when it is fed by hand, or otherwise, at the forward end of the machine.

Referring to one of the carriers 50, reference is made to Fig. 7, where there is a carrier shown more in detail; and it will be seen that it comprises a rectangular casting with the circular opening to form a cylinder 51 in which the piston 52 (Fig. 8) travels. The carrier 50 is provided on its two sides at its upper portion with the outwardly extending lugs 53 which in turn act as supports or bearings for the carrier, as these lugs 53 rest on the heretofore mentioned tracks 38, as may be seen in Fig. 6.

Directly beneath these lugs 53 are the further lugs or shoes 54 which are arcuate on their upper surface and flat on their under surface, and are each provided with a downwardly extending ear 55 about centrally of their length, and through these lugs will be passed pins 56 to secure the carrier 50 to the sprocket chains 12' and 13'.

When the carrier 50 is in its inverted position, that is, travelling beneath the table 2, the arcuate surface of the lugs 54 will bear and be supported by the tracks 41 as may be seen in Fig. 6. Thus, when the carriers 50 are moving on the upper surface of the table 2 they are supported by the lugs 53 on the upper surface of the tracks 38; and when travelling beneath the table 2, they are supported by the shoes 54 on the tracks 41, which are a continuation of the tracks 38. The purpose of this is that by forming the carriers 50 and the lugs 53 and 54 in this manner, the weight at all times is supported by the several tracks, and not by the sprocket chains 12' and 13', which therefore prevents any undue stretch on these chains 12' and 13'.

These endless chains 12' and 13' of course provide the movement for these carriers 50 in their endless trips about the machine.

In Fig. 8, I have shown in section a part of the carrier 50 and I have also shown mounted therein the piston 52 with its die 57 which is preferably cast integral with the piston 52. This die 57 is in the form of a knife with the arcuate blades 58 generating from the center 59 and terminating at the periphery as at 60. There are preferably five of them as this is the common practice in making baker's rolls, to score or divide the dough into five parts.

The under-surface of the piston 52 is provided with the arcuate ribs 61 that bears on the track 43.

It will also be noticed that the upper inner walls of the cylinder 51 of the carrier 50 taper as at 51' so that the disc of dough after being pressed and scored may more easily drop from the carrier 50 when the carrier reaches the far end of the machine and inverts its position.

Secured in the bottom of the portion 61 of the piston 52 is the bolt 63 with its enlarged head 64, which bolt 63, it will be remembered, extends through the split tracks 43 as may be seen in Fig. 6. This bolt 63 with its enlarged head 64, which extends through the split tracks 43 is to prevent the pistons 52 from dropping out of the cylinders when they are in their inverted position in their cycle around the table 2.

It will be understood, however, that other means might be used for permitting movement of the pistons in the cylinders, but preventing the pistons from dropping out of the cylinders when in their inverted position.

In Fig. 8 I have shown a disc of the dough for the unbaked roll, but it will be noted that after passing under the rollers 34, 28, 29, and 30, it will be perfectly flat on what is now the upper surface of the dough. However, this is in reality the bottom of the roll, as the carrier 50 will be inverted when it gets to the far end of the machine; and although the dough in the carrier 50 is scored from the bottom, what is at first the bottom will eventually be the top of the roll.

Also, the dough, when it is dropped from a carrier 50 will drop to the endless conveyor 5, which has heretofore been mentioned, and from this conveyor 5 the now scored rolls will be ready for baking.

It will be understood that when a lump of dough, or disc of dough, is dropped in the cylinder 51 of the carrier 50 at the forward end of the machine (Fig. 3) the piston 52 in the carrier 50 will be in its lowered position; and the disc of dough is of such size that it will loosely fit within the said cylinder 51. Then, as the carrier 50 travels in its forward path and reaches the incline at 45 in the track 43, the bottom of the piston 52 resting on the track 43 will, due to the elevation of the tracks 43, with respect to the carrier tracks 38, be elevated or raised within the cylinder 51, as may be seen by the three carriers 50 directly under the rollers 34, 28, 29, and 30 in Fig. 3.

The dough, in coming in contact with the rollers, will be forced down or held down by the rollers and the elevated dough will be forced around the five knives of the die 57.

It will be noticed that the first roller 34, as heretofore mentioned, is an idle one, and is provided with longitudinal extending serrations 34'. By having this roller 34 idle, rather than positively driven, it will tend to seat any disc of dough that might not have properly seated itself in the cylinder 51 when deposited.

As the carrier 50 continues under the next roller 28, it will be well held down around the blades of the die 57; and as the carrier 50 continues under the rollers 29 and 30, it is continually pressing firmly about the knives so that if the first roller did not cause the dough to hold its scored position, the movement under these two additional rollers 29 and 30 will insure a positive scoring and marking of the dough.

After the carriers 50 have passed under the four rollers, it will be remembered that the track 43 declines, allowing the pistons 52 and the dies 57 to lower; and when each carrier 50 reaches the end of the machine, it will invert itself to now deposit the scored and divided discs of dough top-side-up on the endless dispensing conveyor 5. The pistons 52 then remain in their retracted position until they round the other end of the table 2 to again start out on their journey to the rollers.

As may also be seen in Fig. 3, I provide a trough 70 at the forward end of the machine, which extends to nearly centrally of the machine where it is enlarged at 71. In this enlargement 71 there is mounted the shaft 72 with its brush with the bristles 73 that extend up into the path of the carriers 50 when they are travelling beneath the table 2.

In this trough 70 will be placed salad oil, which will partly fill the well or enlarged portion 71, so that as the cylinders 51 and pistons 52 wipe against the bristles of the brush 73, they will be lubricated with the salad oil so that the dough, after being pressed under the rollers, will more freely drop from the carriers 50 at the far or dispensing end of the machine.

As heretofore mentioned, the machine is mobile and it will be understood that it might easily be placed alongside of another machine to automatically deposit the unscored dough in these advancing carriers 50; or, the dough may be deposited by hand into the cylinders 51 of the carriers 50.

Likewise, the dispensing endless conveyor 5 at the far end of the machine may be set to deliver the scored dough to a place most convenient for placing the scored dough in the ovens.

It will also be understood that rather than having the one series of carriers and their tracks, and the one set of rollers, these might all be duplicated in the machine, so that there would always be two series of carriers passing under their respective rollers.

From the foregoing, it will be seen that I have provided a machine for dividing and scoring baker's rolls, preliminary to their baking; wherein the operation is continuous, it not being necessary at any time to stop the movement of the carriers in their path. On the other hand, the dough in the shape of discs is placed in the carriers at one end of the machine and will be divided and scored and dropped out on the endless conveyor at the far end of the machine without any stop in the operation.

In this manner, I can score and divide the dough (rolls) much more quickly than can be done by any machine of which I am now aware.

Finally, it will be understood that I have not illustrated or described the various guards on the machine, nor the details of construction, as it is not thought necessary for the understanding of the machine and its operation.

Many slight changes might be made without departing from the spirit and scope of the invention.

Having thus described my invention, what I claim is new and desire to secure by Letters Patent is:

1. In a machine for scoring the dough for baker's rolls, endless conveyor chains, means for operating the chains, carriers secured to the chains, tracks for supporting the carriers, each of said carriers provided with a cylindrical opening for holding the dough, a movable piston in said cylindrical opening, rollers mounted slightly above the path of the carriers, means for elevating the pistons and said dough in said carriers when the carriers are beneath said rollers to force the dough in contact with said rollers, and scoring means associated with said pistons.

2. In a machine for scoring the dough for baker's rolls, a table, endless conveyor chains, means for operating the chains, a plurality of carriers secured to the chains, tracks for supporting the carriers, each of said carriers provided with a cylindrical opening for holding the dough, a movable piston in said cylindrical opening, rollers mounted slightly above the path of the carriers about centrally of the machine, track means for elevating the pistons and said dough in said carriers when the carriers are beneath said rollers to force the dough in contact with said rollers, and scoring means associated with said pistons.

3. In a machine for scoring the dough for baker's rolls, a table, endless conveyor chains, means for operating the chains, carriers secured throughout the length of the chains, tracks for supporting the carriers throughout their movement, each of said carriers provided with a cylindrical opening for holding the dough, a movable piston in each of said openings, actuated rollers mounted slightly above the path of the carrier, track means elevated just below said rollers for elevating the piston and said dough in said carriers as the carriers pass under these said rollers to force the dough in contact with said rollers, and scoring means associated with each of said pistons.

4. In a machine for scoring the dough for baker's rolls, a table, endless conveyor chains, means for operating the chains, carriers pinned to said chains, tracks for supporting the carriers throughout their travel, each of said carriers provided with a cylindrical opening for holding the dough, a movable piston in said cylindrical opening, a plurality of actuated rollers mounted slightly above the path of the carriers, a split track supporting the roller ends of the pistons, the said split track elevated with relation to the aforementioned track indirectly under the path of the rollers to thereby elevate the piston and said dough in said carriers when the carriers are beneath the rollers to force the dough in contact with said rollers, and scoring knives formed on the upper surface of the pistons for scoring the dough as the carriers pass beneath said rollers.

5. In a machine for scoring the dough for baker's rolls, endless conveyor chains, means for operating the chains, rectangular carriers secured to the chains, tracks for supporting the carriers, each of said carriers provided with lugs extending outwardly near its upper surface and lugs also extending outwardly near its lower surface, the upper lugs for supporting the carriers on the track when above the table, the lower lugs for supporting the carriers on the track when beneath the table, each of said carriers also provided with a cylindrical opening to receive the dough, a movable piston in each of said cylindrical openings, actuated rollers mounted slightly above the path of the carrier about centrally of the machine, a track for elevating the pistons in said carriers when the carriers are beneath said rollers to force the dough against said rollers, means associated with the pistons for preventing the pistons from dropping out of the carriers when beneath the table, and scoring knives formed on the top of said pistons for scoring the dough as the carriers pass beneath the rollers.

6. In a machine for scoring the dough for baker's rolls, endless conveyor chains, means for operating the chains, carriers secured to the chains, tracks for supporting the carriers, each of said carriers provided with a cylindrical opening for holding the dough, a movable piston in each of said cylindrical openings, rollers mounted slightly above the path of the carriers about centrally of the machine, means for elevating the piston and said dough in said carriers when said carriers are beneath to force the dough against said rollers, scoring means associated with each of said pistons, and an endless conveyor to receive the scored dough.

7. In a machine for scoring the dough for baker's rolls, a table, endless conveyor chains, travelling above and below said table, means for operating the chains, carriers secured to the chains, and in close proximity to each other, tracks for supporting the carriers, each of said carriers provided with a cylindrical opening for holding the dough, a movable piston in each of said cylindrical openings, actuated rollers mounted slightly above the path of the carriers, means for elevating the pistons and said dough in said carriers when the carriers are beneath said rollers, and permitting the pistons to descend after passing between said rollers, scoring means associated with said pistons to score the dough when the carriers are directly below the rollers, and means for conveying the scored dough right-side-up as the dough is dropped from the cylinders after being scored.

LOUIS PORTNER.

REFERENCES CITED

The following references are of record in the file of this patent:

UNITED STATES PATENTS

| Number | Name | Date |
| --- | --- | --- |
| 2,174,658 | Hess | Oct. 3, 1939 |
| 2,263,173 | Johnson | Nov. 18, 1941 |

FOREIGN PATENTS

| Number | Country | Date |
| --- | --- | --- |
| 139,309 | Germany | Mar. 14, 1903 |
| 216,968 | Germany | Dec. 15, 1909 |
| 488,775 | Germany | Jan. 7, 1930 |